United States Patent [19]
Bogg

[11] 4,063,951
[45] Dec. 20, 1977

[54] MANUFACTURE OF TABULAR HABIT SILVER HALIDE CRYSTALS FOR PHOTOGRAPHIC EMULSIONS

[75] Inventor: Thomas George Bogg, Brentwood, England

[73] Assignee: Ciba-Geigy AG, Basel, Switzerland

[21] Appl. No.: 638,777

[22] Filed: Dec. 8, 1975

[30] Foreign Application Priority Data

Dec. 19, 1974 United Kingdom ............... 54868/74

[51] Int. Cl.[2] .......................... G03C 1/02; B01J 13/00
[52] U.S. Cl. ...................................... 96/94 R; 252/317
[58] Field of Search .............. 96/94 R, 114.7; 423/46; 23/295 G; 252/317

[56] References Cited

U.S. PATENT DOCUMENTS 3,598,593 8/1971 Klinger ................................ 96/94 R
3,650,757 3/1972 Irie et al. ............................ 96/94 R
3,655,394 4/1972 Illingsworth ........................ 96/94 R
3,784,381 1/1974 Perignon ............................. 96/94 R

OTHER PUBLICATIONS

Properties of Photographic Emulsion Grains, Klein & Moisar, J. of Photo. Sci., vol. 12, 1964.
Zelikman & Levi, Making & Coating Photog. Emulsions, pp. 138–141, © 1964, Focal Press, London, Eng.

*Primary Examiner*—David Klein
*Assistant Examiner*—Louis Falasco
*Attorney, Agent, or Firm*—Burgess, Dinklage & Sprung

[57] ABSTRACT

A process for the manufacture of photographic silver halide emulsions wherein the silver halide crystals are of tabular habit bounded by (100) cubic faces and which have an aspect ratio of from 1.5:1 to 7:1 is provided. The size of the crystals is from 0.2μ to 3.0μ in edge length, and they are obtained by adding an aqueous solution of a water-soluble halide and an aqueous solution of silver nitrate to an aqueous colloid medium by a double jetting technique at a controlled pAg value of between 4.0 and 8.0 and at a controlled constant temperature within the range of 35° to 75° C to produce monodispersed untwinned seed crystals. The seed crystals are then increased in size by Ostwald ripening in the presence of sufficient ammonia and alkali halide to favor the cubic habit of the crystals at a temperature of between 30° to 70° C. The photographic silver halide emulsion exhibit a high contrast on exposure and development.

11 Claims, 5 Drawing Figures

Figure 1:
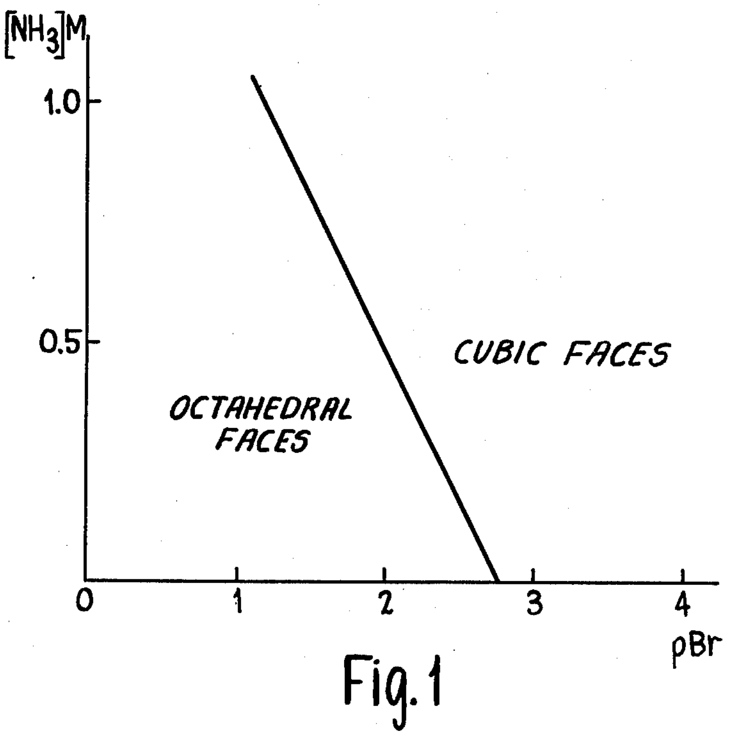

The effect of ammonia and added ammonium bromide concentration on the habit of silver bromide Size distribution comparison Fig. 5 Sensitometric comparison
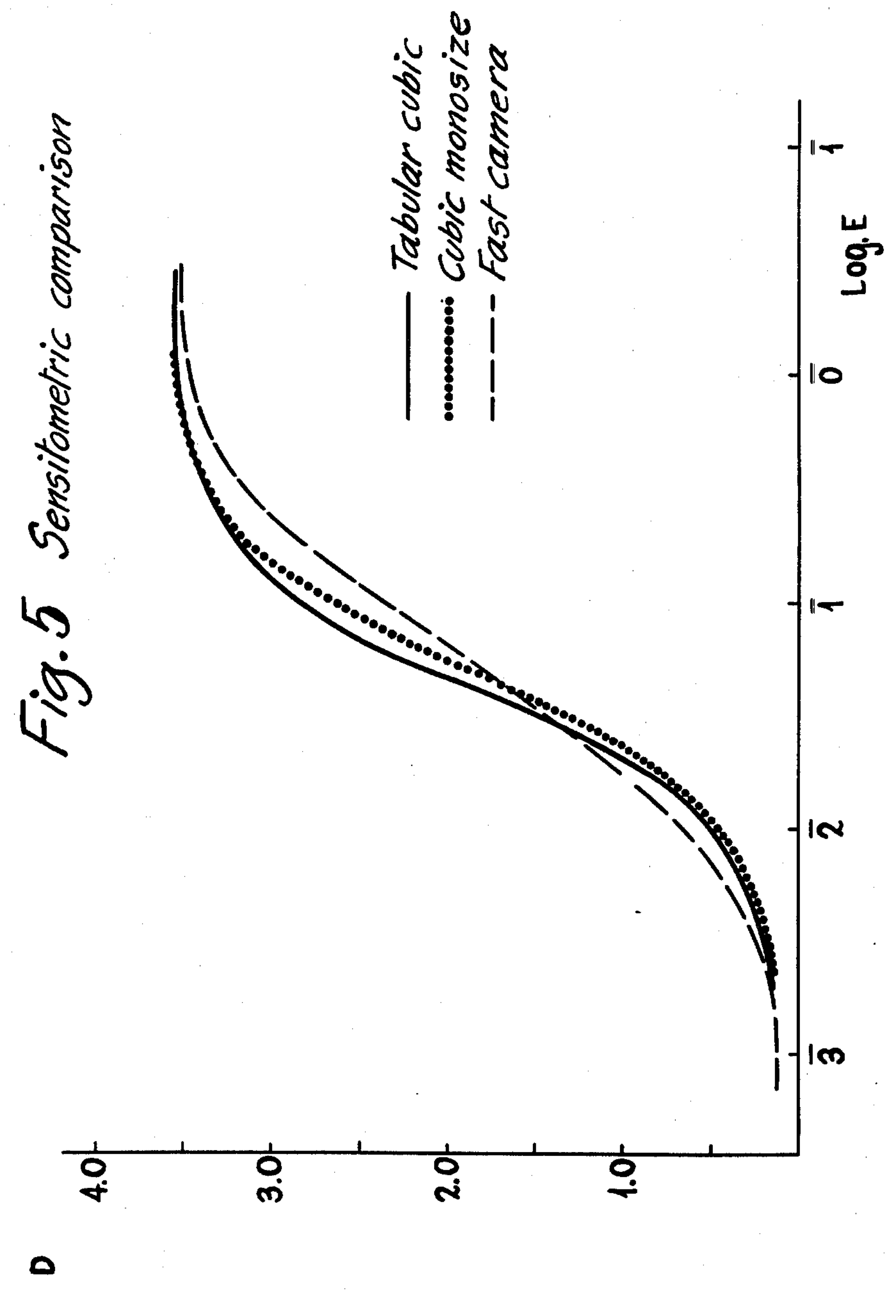

MANUFACTURE OF TABULAR HABIT SILVER HALIDE CRYSTALS FOR PHOTOGRAPHIC EMULSIONS

This invention relates to photographic silver halide emulsions.

Most silver halide emulsions used in the production of photographic silver halide material contain silver halide crystals having two types of external face. These are either (100) cubic or (111) octahedral faces. The shapes or habit of the crystals is further modified by the presence of internal stacking defects or twin planes, leading to approximately spherical crystals bounded by (100) cubic faces and tabular crystals bounded by (111) octahedral faces. Recently a new shape of silver halide crystal has been discovered which when used in silver halide emulsion exhibits useful photographic properties. These crystals are of tabular habit bounded by (100) cubic faces and which have an aspect ratio of from 1.5:1 to 7:1. The size of the crystals is from 0.2μto 3.0μin edge length. By the term 'edge length' is meant the length of an edge when the crystal has a square projected area and the square root of the product of the length of the edges when the crystal has a rectangular projected area. The aspect ratio is defined as edge length/thickness of the crystals. The aspect ratios of the crystals are determined from electronmicrographs.

Therefore according to the present invention there is provided a process for the production of a silver halide emulsion wherein the silver halide crystals are of tabular habit bounded by (100) cubic faces and which have an aspect ratio of from 1.5:1 to 7:1 the size of the crystals being from 0.2μ to 3.0μ in edge length, which process comprises adding an aqueous solution of a water soluble halide and an aqueous solution of silver nitrate to an aqueous colloid medium by a double jetting technique at a controlled pAg value of between 4.0 and 8.0 and at a controlled constant temperature within the range of 35° – 75° to produce monodispersed untwinned seed crystals and then allowing the seed crystals to increase in size by Ostwald ripening in the presence of sufficient ammonia and alkali halide to favour the cubic habit of the crystals at a temperature of between 35° to 70° C.

Preferably the pAg during the formation of the seed crystals by the double jetting technique is between 5.0 and 7.0 and most preferably between 5.5 and 6.5.

Preferably the ammonia concentration during the Ostwald ripening is between 0.1 and 1 molar. Preferably the alkali halide concentration during the Ostwald ripening is between 0 and 0.1 molar.

Preferably the temperature during Ostwald ripening is between 40° – 50° C.

The double jetting technique for the preparation of silver halide emulsions consists of adding simultaneously aqueous silver nitrate solution and aqueous alkali halide solution to an aqueous colloid medium which is continuously stirred and maintained at a constant temperature. In the process of the present invention the monodispersed seed crystals are prepared by such a double jetting technique. In order to avoid the formation of twinned crystals which occurs when either ion is in significant excess, the pAg during nucleation is closely controlled e.g. by automatic adjustment of the flow rate of one of the solutions. Provided that the pAg is maintained within the specified limits an untwinned monosize emulsion is prepared using this method. During nucleation of the seed crystals the temperature, pAg, addition rate of reactant solutions by double jetting and the type of colloid medium present can be varied to effect the size of seed crystals produced and their number concentration.

The Ostwald ripening process used for the growth of silver halide crystals depends on solubility differences between individual crystals of a given population. The differences cause dissolution of the more soluble crystals and deposition of silver halide onto the less soluble crystals leading to an overall increase in crystal size. The main factors influencing crystal solubility are the crystal size, halide composition and nature of the crystal habit or lattice.

In order that ripening occurs at a conveniently fast rate, it is usual to add silver halide solvents for example an excess of one or other of the consitituent ions, ammonia, and other silver halide complexing agents which enhance the solubility differences, and to ripen at an elevated temperature.

The relative concentrations of these solvents and in particular the relative concentrations of ammonia and halide ions, especially bromide ions, determine the crystal habit of the silver halide crystals during the Ostwald ripening. In the process of the present invention it is required that the conditions during Ostwald ripening are those that favour a cubic habit for the silver halide crystals. These conditions are shown in the accompanying FIG. 1 wherein the relative concentrations of ammonia and bromide ion which favour the cubic habit of silver bromide have been set forth. Similar results have been described by W. Morcocki and A. Zaleski in Phot. Sci. Eng. 17 289-294, 1973.

In the method of the present invention it is found that the ripening of an untwinned seed emulsion in conditions favouring the cubic habit leads to the formation of tabular crystals bounded by (100) cubic faces. Approximately 1% of the total number of seed crystals increase in size to form tabular crystals, the remainder dissolve away.

The process of the present invention may be a continuous one of nucleation to form the seed crystals followed by Ostwald ripening all in the same aqueous medium or it may be a two stage process, the seed crystals having been prepared well before they are ripened to form the tabular crystals, the seed crystals being removed from the nucleation medium and placed in fresh medium before Ostwald ripening stage. In a modification of the above method after the tubular crystals have been prepared more untwinned mondispersed seed crystals are added to the aqueous medium. These crystals also dissolve and increase the size of the tubular crystals being formed by Ostwald ripening.

Most preferably the colloid medium is an aqueous gelatin solution. However part or all the gelatin may be replaced by any one of the synthetic or naturally occurring polymeric substances which have been used as colloid binders for silver halide emulsions. Examples of such polymeric materials are albumin, casein, polyvinyl alcohol and polyvinyl pyrrolidone.

The halide composition of the silver halide crystals of the silver halide emulsion of the present invention may be for example pure bromide, pure chloride or mixtures of these two and including some iodide. Preferably however the final tubular crystals should not contain more than 1% iodide.

Figure 2:
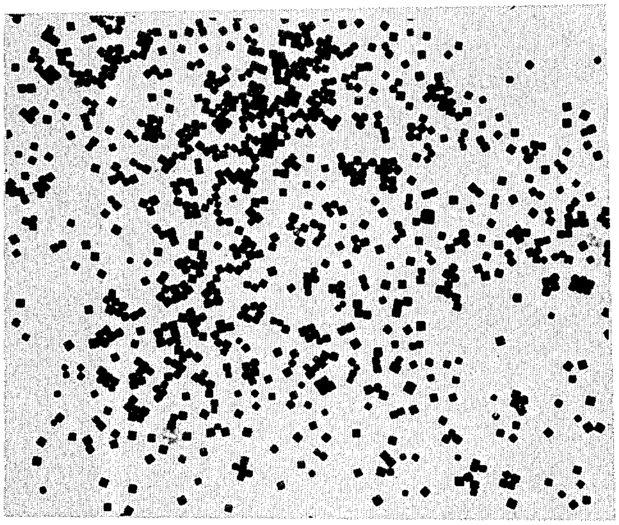

The accompanying FIG. 2 shows some seed crystals which may be used to produce the silver halide emulsion of the present invention.

Figure 3:
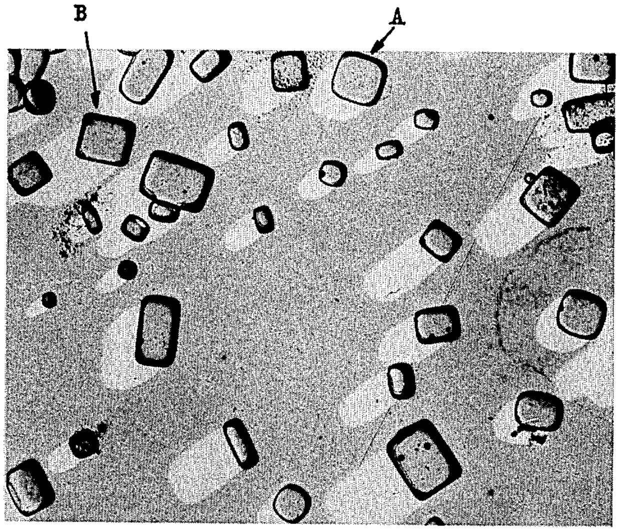

The accompanying FIG. 3 shows the tabular silver halide crystals which have been prepared in the course of the process of the present invention. These crystals contain 99.5% bromide and 0.5% iodide. They have an average aspect ratio of 2:1. However, the crystal designated A has an aspect ratio of 4:1. The median edge length of the seed crystals is 0.19μ and the median edge length of the tabular crystals is 0.93μ.

However in FIG. 3 the crystals have been shadowed with Au/Pd at a ratio of 2:1, such that a cubic crystal exhibits a shadow length of twice its edge length.

The aspect ratio of the crystals of FIG. 3, given by edge length/thickness varies between 4:1, illustrated by crystal A, and 1:1 (cubic) illustrated by crystal B in this figure. The crystals are predominately bounded by (100) cubic faces. The emulsions prepared according to the present invention in which the silver halide crystals are predominantly of the tabular type exhibit a desirably high contrast on exposure and development as shown in the accompanying Example.

The following Example will serve to illustrate the invention:

EXAMPLE

Formation of Seed Crystals 2 liters of 5% inert gelatin was maintained at 65° C and stirred at 250 rpm with 0.2 ml tri-n-butyl orthophosphate as an antifoam. A solution of 4.7 molar silver nitrate and a solution of 4.7 molar ammonium bromide containing 0.5% ammonium iodide were double jetted into the stirred gelatin at 1270 ml per hour until 480 ml of silver nitrate had been added. The pAg was controlled at 6.1 ± 0.6 throughout nucleation, giving an average final crystal size of 0.19μ.

The monodispersed untwinned seed crystals produced are those shown in FIG. 2.

Production of Tabular Crystals 147 ml of 11.8 molar ammonia solution was added to 2.6 liters of the above medium containing the seed crystals to produce a 0.631 molar solution of ammonia at 45° C, and the stirring continued during Ostwald ripening. Formation of tabular cubic crystals and substantially complete dissolution of the remaining nuclei was achieved after 10 minutes ripening at 45° C.

The tabular crystals produced are those shown in FIG. 3.

The Sensitisation of the Emulsion

Figure 4:
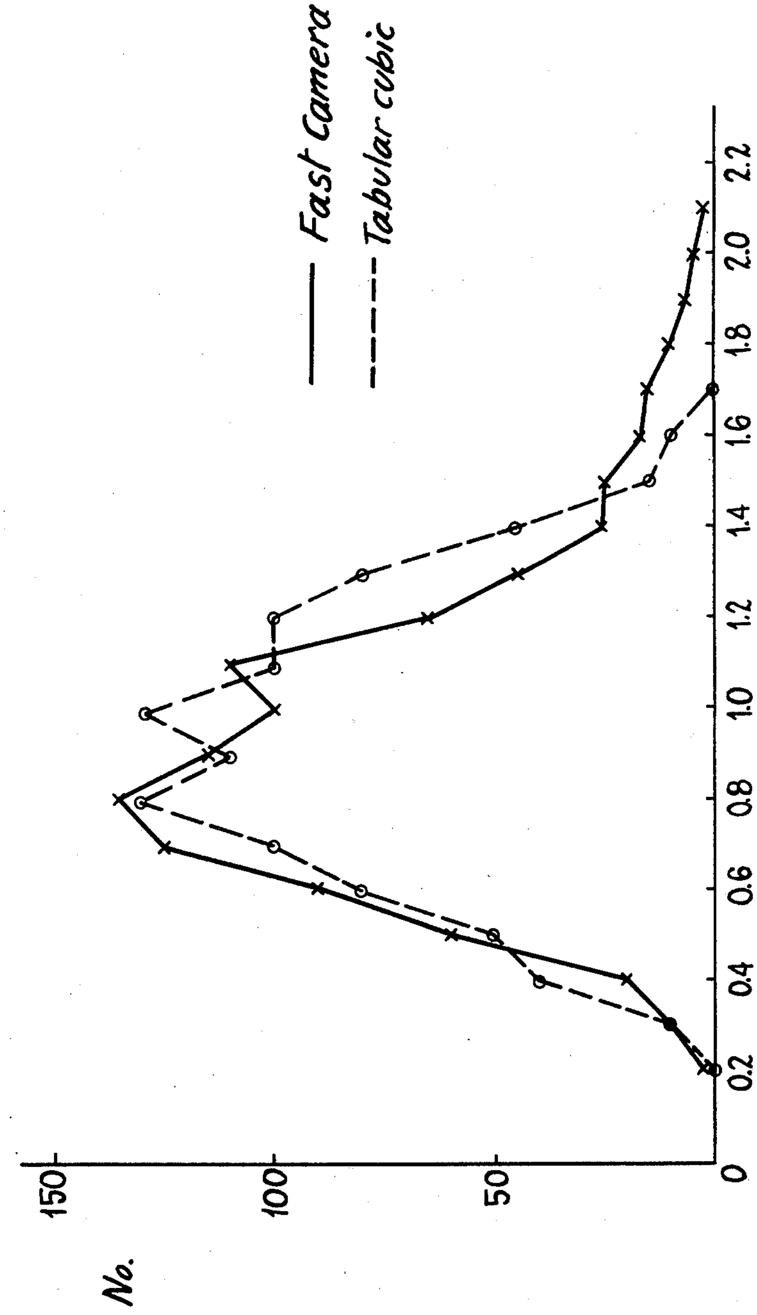

The emulsion was flocculated using conventional techniques, washed and dispersed with a total of 90 g of limed ossein gelatin. The final median edge length was estimated at 0.93μ in FIG. 3; the size distribution is compared with that of a fast camera emulsion in FIG. 4.

The emulsion was digested for range of times at pH 6.2 and pAg 8.4 in the presence of 11 mg/mole of sodium thiosulphate pentahydrate and 1mg/mole of sodium tetrachloroaurate dihydrate. The emulsion was then stabilised using 7-hydroxy 5-methyl 2-methylthio 1,3,4-triazaindolizine. The sensitised emulsion was then coated on to plastic base at a coating weight of 53 mg $Ag/dm^2$.

Photographic Results

The strips were then imagewise exposed for 0.02 seconds and developed for 4 minutes in a metol/hydroquinone base developer. The photographic results obtained are shown in FIG. 5. FIG. 5 also shows the results obtained when a fast camera emulsion which was made as described below was similarly exposed and developed, and also a monodispersed emulsion which had been made as described below was similarly exposed and developed.

The fast camera emulsion used in this example is a commercial formulation. In summary, 1.5 moles of 3 N silver nitrate solution were jetted into 2 liters of 1.5% gelatin solution containing 2.5 moles of 3 N ammonium bromide, 0.082 moles of 1.2 N potassium iodide and 3.07 moles of 11.8 N ammonia solution. After ripening the median linear size of the emulsion was 0.88 μ.

The monosize seed emulsion used in this example was prepared using similar conditions to those specified in the example in BP No. 1,335,925, except that addition rates of silver and bromide solutions were only 80% of those in the example in BP No. 1,335,925, for ease of preparation. The emulsion had a median linear size of 0.78μ and standard deviation of size 0.06μ.

These results show that the silver halide emulsion containing the tabular crystals exhibits a higher contrast than the fast camera speed emulsion and a slightly higher contrast than the monodispersed emulsion even though it has a much wider size distribution than the monodispersed emulsion.

The invention includes not only the processes for the preparation of silver halide emulsions containing the tabular crystals as hereinbefore set forth but also silver halide emulsions so prepared and photographic material comprising at least one such silver halide emulsion on a layer thereof.

What is claimed is:

1. A process for the production of a photographic silver halide emulsion wherein the silver halide crystals are of tabular habit bounded by (100) cubic faces and which have an aspect ratio of from 1.5:1 to 7:1 the size of the crystals being from 0.2μ to 3.0μ in edge length, which process comprises adding an aqueous solution of a water-soluble halide and an aqueous solution of silver nitrate to an aqueous colloid medium by a double jetting technique at a controlled constant pAg value of between 5.0 and 7.0 and at a controlled constant temperature within the range of 35° to 75° to produce monodispersed untwinned seed crystals and then allowing the seed crystals to increase in size by Ostwald ripening in the presence of an ammonia concentration between 0.1 and 1 molar and an alkali halide concentration between 0 and 0.1 molar at a temperature of between 30° to 70 C.

2. A process according to claim 1 wherein the pAg during formation of the seed crystals by the double jetting technique is between 5.5 and 6.5.

3. A process according to claim 1 wherein the temperature during the Ostwald ripening is between 40°-50° C.

4. A process according to claim 1 wherein during the formation of the monodispersed untwinned seed crystals the temperature is maintained at 65° C.

5. A process according to claim 1 which is a continuous process wherein the monodispersed seed crystals are subjected to Ostwald ripening in the same medium in which they were formed.

6. A process according to claim 1 wherein after the monodispersed untwinned seed crystals have been prepared they are removed from the aqueous medium in which they were formed and subsequently placed in a fresh aqueous medium for the Ostwald ripening process.

7. A process according to claim 1 wherein after the tabular silver halide crystals have been formed further monodispersed untwinned seed crystals are added to the aqueous Ostwald ripening medium to increase the size of the tabular crystals.

8. A process according to claim 1 wherein the colloid medium is an aqueous gelatin solution.

9. A process according to claim 1 wherein the iodide proportion of the alkali halide added is such that the final tabular crystals contain not more than 1% iodide.

10. A silver halide emulsion prepared by the process as claimed in claim 1.

11. Photographic material which comprises at least one silver halide emulsion as claimed in claim 10 in a layer thereof either along or in admixture with any other silver halide emulsion.

* * * * *